(12) United States Patent
Akiyama

(10) Patent No.: US 8,332,073 B2
(45) Date of Patent: Dec. 11, 2012

(54) LIBRARY APPARATUS AND ROBOT

(75) Inventor: Yoshiki Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 12/633,188

(22) Filed: Dec. 8, 2009

(65) Prior Publication Data
US 2010/0161110 A1    Jun. 24, 2010

(30) Foreign Application Priority Data
Dec. 24, 2008    (JP) ................................. 2008-327630

(51) Int. Cl.
G06F 7/00    (2006.01)
G06F 19/00    (2011.01)

(52) U.S. Cl. ......................... 700/262; 700/214; 700/251

(58) Field of Classification Search .................. 700/214, 700/245, 250, 251, 258, 259, 262; 360/69–78.15, 360/90–96.61
See application file for complete search history.

(56) References Cited

U.S. PATENT DOCUMENTS

| | | | | |
|---|---|---|---|---|
| 5,659,440 A * | 8/1997 | Acosta et al. | ................. | 360/92.1 |
| 5,757,738 A * | 5/1998 | Ohba et al. | ................. | 369/30.32 |
| 5,867,003 A * | 2/1999 | Hashimoto et al. | ....... | 318/568.11 |
| 5,963,514 A | 10/1999 | Kanetsuku et al. | | |
| 5,966,266 A * | 10/1999 | Kato et al. | .................... | 360/92.1 |
| 5,967,339 A | 10/1999 | Utsumi et al. | | |
| 6,019,563 A | 2/2000 | Murata et al. | | |
| 6,026,063 A * | 2/2000 | Ohba et al. | ................. | 369/30.28 |
| 6,034,928 A * | 3/2000 | Inoue | ......................... | 369/30.42 |
| 6,058,337 A * | 5/2000 | Akiyama et al. | ............... | 700/218 |
| 6,184,643 B1 * | 2/2001 | Akiyama et al. | ............... | 318/566 |
| 6,583,402 B1 | 6/2003 | Watanabe | | |
| 2002/0101676 A1* | 8/2002 | Ellis | ................. | 360/69 |
| 2002/0145034 A1* | 10/2002 | Shimada et al. | ............... | 235/375 |
| 2003/0137766 A1* | 7/2003 | Ellis et al. | ........................ | 360/69 |
| 2006/0044672 A1* | 3/2006 | Steinhilber | ...................... | 360/92 |
| 2007/0199997 A1* | 8/2007 | Hoshino | .................. | 235/462.43 |

FOREIGN PATENT DOCUMENTS

| | | |
|---|---|---|
| JP | 64-25340 | 1/1989 |
| JP | 05-167538 | 7/1993 |
| JP | 11-24750 | 1/1999 |
| JP | 11-96630 | 4/1999 |
| JP | 11-96631 | 4/1999 |
| JP | 11-273816 | 10/1999 |

OTHER PUBLICATIONS

Japanese Office Action issued Jan. 18, 2011 in corresponding Japanese Patent Application 2008-327630.

* cited by examiner

Primary Examiner — Dalena Tran
Assistant Examiner — Jason Holloway
(74) Attorney, Agent, or Firm — Staas & Halsey LLP

(57) ABSTRACT

A library apparatus includes a robot which transports a transportable medium, an objective unit including a light receptor of the objective unit and a light emitter of the objective unit which emits light to the outside of the objective unit when light is received by the light receptor of the objective unit. The robot includes a light emitter of the robot opposite to the light receptor of the objective unit that emits light to the light receptor of the objective unit at the time of positioning of the robot at the objective unit, and a light receptor of the robot opposite to the light emitter of the objective unit that receives light from the light emitter of the objective unit at the time of positioning of the robot at the objective unit.

13 Claims, 14 Drawing Sheets

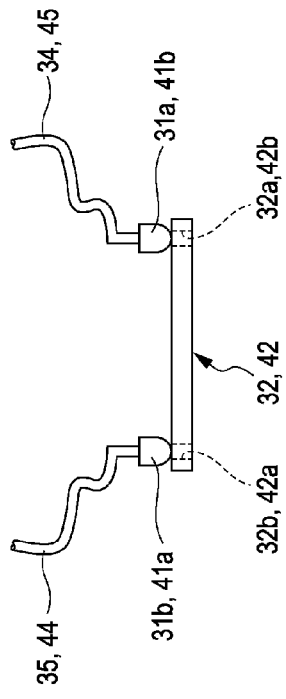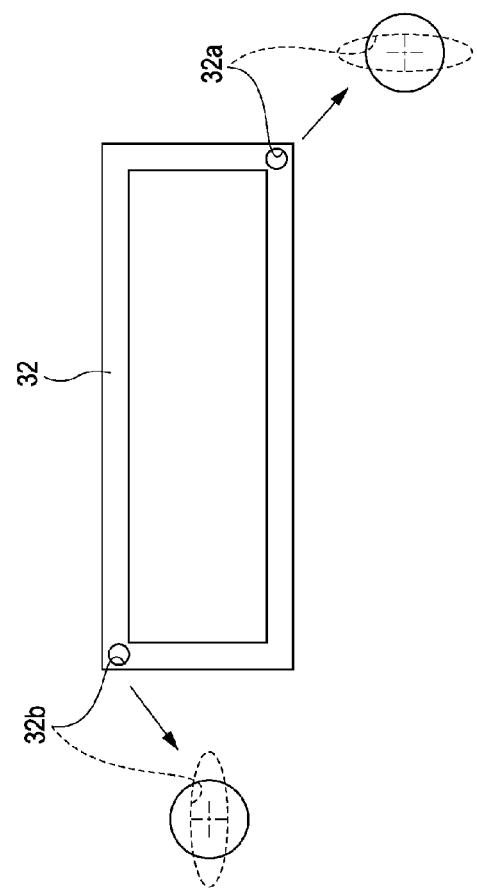

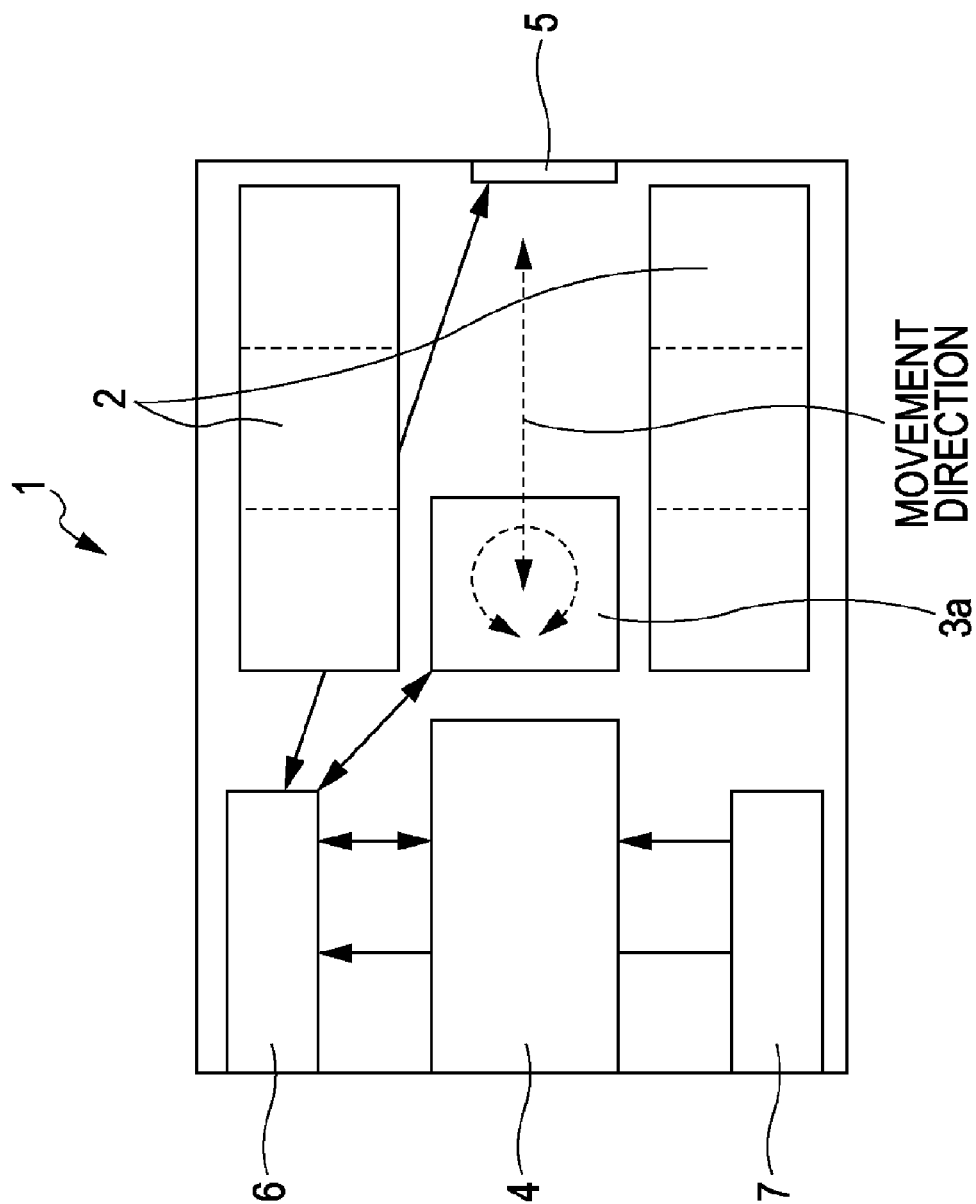

FIG. 12

| | CELL 00 CORRECTION VALUE | | | CELL 01 CORRECTION VALUE | | | CELL 02 CORRECTION VALUE | | | CELL 03 CORRECTION VALUE | | | CELL 04 CORRECTION VALUE | | | CELL 05 CORRECTION VALUE | | |
|---|---|---|---|---|---|---|---|---|---|---|---|---|---|---|---|---|---|---|
| INITIAL VALUE | 0 | 0x10 | 0x10 | 0 | 0x20 | 0x10 | 0 | 0x30 | 0x10 | 0 | 0x40 | 0x10 | 0 | 0x50 | 0x10 | 0 | 0x60 | 0x10 |
| UPDATING (1) | 1 | 0x19 | 0x12 | | | | | | | | | | | | | | | |
| UPDATING (2) | | | | 0 | 0x29 | 0x12 | 0 | 0x39 | 0x12 | 0 | 0x49 | 0x12 | 0 | 0x59 | 0x12 | 0 | 0x69 | 0x12 |

| | CELL 06 CORRECTION VALUE | | | CELL 07 CORRECTION VALUE | | | CELL 08 CORRECTION VALUE | | | CELL 09 CORRECTION VALUE | | | CELL 10 CORRECTION VALUE | | | CELL 11 CORRECTION VALUE | | |
|---|---|---|---|---|---|---|---|---|---|---|---|---|---|---|---|---|---|---|
| INITIAL VALUE | 0 | 0x10 | 0x20 | 0 | 0x20 | 0x20 | 0 | 0x30 | 0x20 | 0 | 0x40 | 0x20 | 0 | 0x50 | 0x20 | 0 | 0x60 | 0x20 |
| UPDATING (2) | 0 | 0x19 | 0x22 | 0 | 0x29 | 0x22 | 0 | 0x39 | 0x22 | 0 | 0x49 | 0x22 | 0 | 0x59 | 0x22 | 0 | 0x69 | 0x22 |
| UPDATING (4) | 0 | 0x17 | 0x22 | 0 | 0x27 | 0x22 | 0 | 0x37 | 0x22 | 0 | 0x47 | 0x22 | 0 | 0x57 | 0x22 | 0 | 0x67 | 0x22 |

| | CELL 12 CORRECTION VALUE | | | CELL 13 CORRECTION VALUE | | | CELL 14 CORRECTION VALUE | | | CELL 15 CORRECTION VALUE | | | CELL 16 CORRECTION VALUE | | | CELL 17 CORRECTION VALUE | | |
|---|---|---|---|---|---|---|---|---|---|---|---|---|---|---|---|---|---|---|
| INITIAL VALUE | 0 | 0x10 | 0x30 | 0 | 0x20 | 0x30 | 0 | 0x30 | 0x30 | 0 | 0x40 | 0x30 | 0 | 0x50 | 0x30 | 0 | 0x60 | 0x30 |
| UPDATING (2) | 0 | 0x19 | 0x32 | 0 | 0x29 | 0x32 | 0 | 0x39 | 0x32 | 0 | 0x49 | 0x32 | 0 | 0x59 | 0x32 | 0 | 0x69 | 0x32 |
| UPDATING (4) | 0 | 0x15 | 0x32 | 0 | 0x25 | 0x32 | 0 | 0x35 | 0x32 | 0 | 0x45 | 0x32 | 0 | 0x55 | 0x32 | 0 | 0x65 | 0x32 |
| UPDATING (5) | | | | 1 | 0x25 | 0x30 | | | | | | | | | | | | |
| UPDATING (6) | 0 | 0x15 | 0x30 | | | | 0 | 0x35 | 0x30 | 0 | 0x45 | 0x30 | 0 | 0x55 | 0x30 | 0 | 0x65 | 0x30 |

| | CELL 18 CORRECTION VALUE | | | CELL 19 CORRECTION VALUE | | | CELL 20 CORRECTION VALUE | | | CELL 21 CORRECTION VALUE | | | CELL 22 CORRECTION VALUE | | | CELL 23 CORRECTION VALUE | | |
|---|---|---|---|---|---|---|---|---|---|---|---|---|---|---|---|---|---|---|
| INITIAL VALUE | 0 | 0x10 | 0x40 | 0 | 0x20 | 0x40 | 0 | 0x30 | 0x40 | 0 | 0x40 | 0x40 | 0 | 0x50 | 0x40 | 0 | 0x60 | 0x40 |
| UPDATING (2) | 0 | 0x19 | 0x42 | 0 | 0x29 | 0x42 | 0 | 0x39 | 0x42 | 0 | 0x49 | 0x42 | 0 | 0x59 | 0x42 | 0 | 0x69 | 0x42 |
| UPDATING (3) | | | | | | | | | | 1 | 0x43 | 0x42 | | | | | | |
| UPDATING (4) | 0 | 0x13 | 0x42 | 0 | 0x23 | 0x42 | 0 | 0x33 | 0x42 | | | | 0 | 0x53 | 0x42 | 0 | 0x63 | 0x42 |

| | CELL 24 CORRECTION VALUE | | | CELL 25 CORRECTION VALUE | | | CELL 26 CORRECTION VALUE | | | CELL 27 CORRECTION VALUE | | | CELL 28 CORRECTION VALUE | | | CELL 29 CORRECTION VALUE | | |
|---|---|---|---|---|---|---|---|---|---|---|---|---|---|---|---|---|---|---|
| INITIAL VALUE | 0 | 0x10 | 0x50 | 0 | 0x20 | 0x50 | 0 | 0x30 | 0x50 | 0 | 0x40 | 0x50 | 0 | 0x50 | 0x50 | 0 | 0x60 | 0x50 |
| UPDATING (2) | 0 | 0x19 | 0x52 | 0 | 0x29 | 0x52 | 0 | 0x39 | 0x52 | 0 | 0x49 | 0x52 | 0 | 0x59 | 0x52 | 0 | 0x69 | 0x52 |
| UPDATING (4) | 0 | 0x11 | 0x52 | 0 | 0x21 | 0x52 | 0 | 0x31 | 0x52 | 0 | 0x41 | 0x52 | 0 | 0x51 | 0x52 | 0 | 0x61 | 0x52 |

LIBRARY APPARATUS AND ROBOT

CROSS-REFERENCE TO RELATED APPLICATIONS

This application is based upon and claims the benefit of priority of the prior Japanese Patent Application No. 2008-327630, filed on Dec. 24, 2008, the entire contents of which are incorporated herein by reference.

FIELD

Embodiments discussed herein relate to technology for positioning a robot of a library apparatus to an object unit.

BACKGROUND

In general, a library apparatus functions as a large capacity external storage. Accordingly, a number of cartridges which accommodate magnetic tapes as storage media, for example, are stored at an accommodation rack in a casing. Then, reading/writing of data is performed against the storage media in each of the cartridges. In addition to the accommodation rack, the library apparatus includes a tape drive unit as a recording/reproducing device and a robot. The tape drive unit performs reading/writing of data against the storage media in the cartridge, while the robot transports the cartridge between the tape drive unit and the accommodation rack.

With the library apparatus, when an access request for a cartridge is received from a host, the robot is moved to the accommodation rack which stores the cartridge. Then, a hand mechanism of the robot is positioned at a cell which accommodates the cartridge. Subsequently, the robot transports the cartridge to the tape drive unit in a state of holding with the hand mechanism and inserts the cartridge into the tape drive unit. A process on the storage medium in the cartridge is performed in the tape drive unit. The cartridge ejected from the tape drive unit after the process is completed is held by the hand mechanism of the robot once more. Then, the cartridge is transported to the accommodation rack by the robot and is accommodated in a predetermined cell.

In the library apparatus, as illustrated in FIG. 15, flags 201 to 204 are respectively arranged at cells 101 to 104 of four corners of a cell group of the accommodation rack 100 so that the robot can position the hand mechanism accurately to each cell of the accommodation rack 100. Here, the flag denotes a mark capable of being read by an optical sensor which is arranged at the hand mechanism. The flag 201 arranged at the cell 101 is a positioning reference flag and the flags 202 to 204 which are respectively arranged at the other three cells 102 to 104 are relative position flags.

Here, the accommodation rack 100 illustrated in FIG. 15 is constituted with the cell group of cells 100a which are pieces of five multiplied by six by connecting five sets of subunits in the lateral direction (i.e., the horizontal direction), the subunit being arranged by layering and integrating six cells 100a in the longitudinal direction (i.e., the vertical direction). The cells at the four corners among the cells 100a which constitute the cell group are specified by numerals 101 to 104.

Upon initialization of the apparatus at the time of powering etc., first, respective position data and image data of each of the flags 201 to 204 are obtained by positioning the robot (i.e., the hand mechanism) to the flags 201 to 204. Based on the position data and the image data of four positions which are obtained as mentioned above, a deviation amount of the actual position from the design position of each cell is calculated in the vertical direction and the horizontal direction. Then, when the robot is positioned to each cell, the positioning control of the robot against the cell is performed by utilizing the calculated deviation amount as correction data.

Specifically, the position of the whole accommodation rack is recognized by reading the four flags 201 to 204. Accordingly, the frontage of the cell group is perceived as a surface. Subsequently, the frontage of the cell group is meshed in accordance with the number of the cells. Then, based on the mesh, the center coordinates of the frontage of each cell 100a is obtained as the position of each cell 100a. The position correction of each cell 100a at the abovementioned initialization of the apparatus is effective in a case that cell arrangement of the cell group of the entire surface of the accommodation rack 100 is uniform and all of the cells 100a are deformed evenly against the deformation of the casing of the library apparatus.

Here, in the library apparatus which has a number of cells, a cell group at a surface of an accommodation rack is constituted with a plurality of subunits which are formed to be divided. As mentioned above, in the example of FIG. 15, the subunit is formed to be integrated by superimposing six pieces of cells 100a in the longitudinal direction. Then, the accommodation rack 100 is formed by connecting five sets of subunits in the lateral direction. Accordingly, there is a case that an attaching position of only one subunit is deviated from other subunits depending on assembling accuracy of each subunit itself or assembling accuracy of mutual connecting of the subunits or due to deformation of the casing by receiving some impact etc. during transportation of the library apparatus. In FIG. 15, the attaching position of only a center subunit A among the five subunits which are connected in the lateral direction is slightly deviated from other subunits in the right lateral direction.

In a case that the abovementioned apparatus initialization is performed in a state that only the subunit A is deviated from the other subunits, the positioning control of the robot can be accurately performed against the cells of subunits other than the subunit A (for example, the cell of (1)). Therefore, inserting and extracting of a cartridge can be performed without a problem against the cells of the subunits other than the subunit A. However, when the robot is positioned at the cell which belongs to the subunit A (for example, the cell of (2)), the positioning control cannot be accurately performed with the correction data obtained by the above-mentioned apparatus initialization since the deviation amount of only the subunit A is not even in the lateral direction. In particular, when the deviation amount exceeds the allowance error range of the positioning of the robot, there arises a case that the robot cannot perform the inserting and extracting of the cartridge against the cell of the subunit A.

In a case that the inserting and extracting of the cartridge against the cell cannot be performed, normally, the robot is operated with retry control for searching a position at which the inserting and extracting of the cartridge can be performed while shifting the position of the hand mechanism slightly in the vertical direction and the horizontal direction. Since such retry control accompanies the inserting and extracting of the cartridge by the hand mechanism, there is a risk that a mechanical part of the cell or the hand mechanism of the robot is interfered and broken. At the worst, there is a risk that the library apparatus becomes incapable of being operated and system-down is caused.

SUMMARY

According to an aspect of the invention, a library apparatus includes, a robot which transports a transportable medium, an objective unit for positioning of the robot including a light receptor of the objective unit and a light emitter of the objective unit which emits light to the outside of the objective unit when light is received by the light receptor of the objective unit. The robot includes a light emitter of the robot opposite to the light receptor of the objective unit that emits light to the light receptor of the objective unit at the time of positioning of the robot at the objective unit, and a light receptor of the robot opposite to the light emitter of the objective unit that receives light from the light emitter of the objective unit at the time of positioning of the robot at the objective unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 7 illustrates the configuration of a light emission and reception system of the recording/reproducing device of FIG. 5 and the hand mechanism of FIG. 6;

FIG. 8 illustrates shapes of mask plates of FIG. 6 and FIG. 7;

FIG. 9 illustrates the entire configuration of the library apparatus to which the robot and a positioning device thereof of the present embodiment are applied;

FIG. 12 illustrates an example of a data updating state of the storage portion at the positioning process of the present embodiment;

DETAILED DESCRIPTION OF THE PREFERRED EMBODIMENTS

Figure 1:
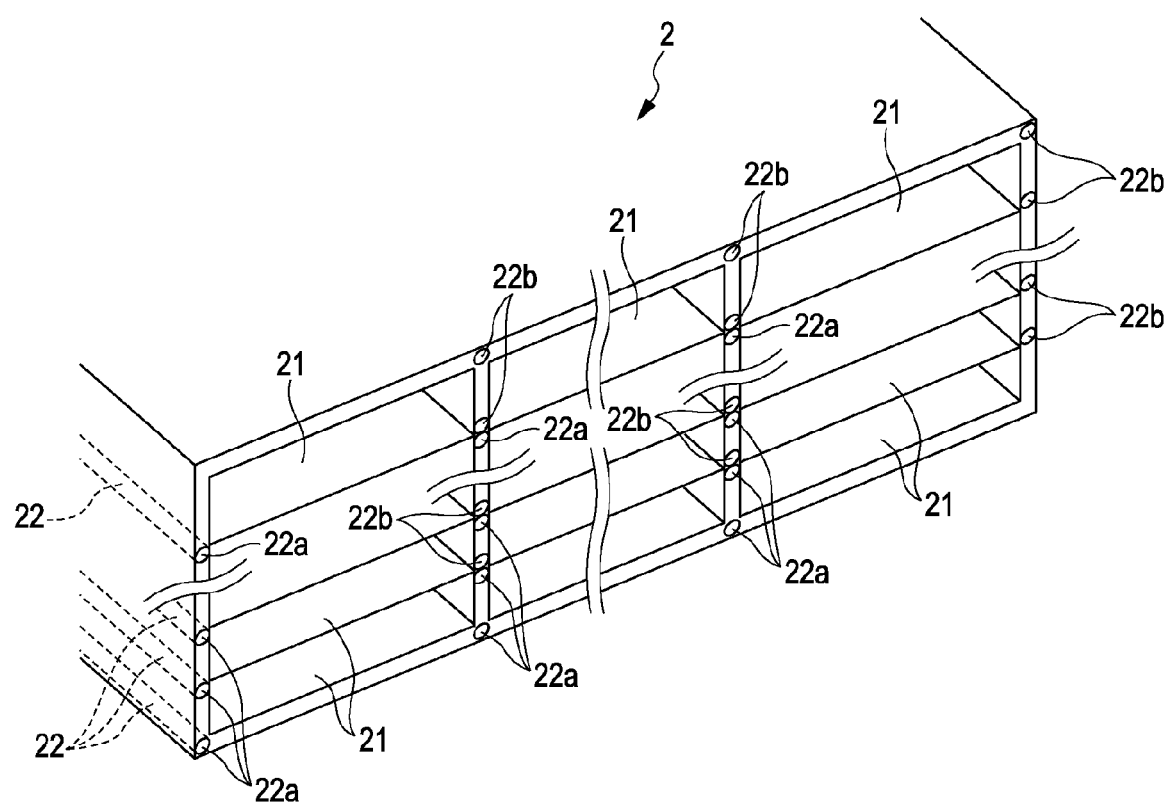
FIG. 1 illustrates a cartridge accommodation rack as an objective target for positioning of a robot of an embodiment.

Reference may now be made in detail to embodiments of the present invention, examples of which are illustrated in the accompanying drawings, wherein like reference numerals refer to like elements throughout.

In the following, embodiments of the present invention are described with reference to the drawings.

[1] Configuration of the Present Embodiment

First, a library apparatus 1 to which a robot and a positioning device thereof of the present embodiment are applied is described with reference to FIG. 9. As illustrated in FIG. 9, the library apparatus 1 includes a cartridge accommodation rack 2, a robot 3, a recording/reproducing device 4, an operational panel 5, an apparatus control circuit 6 and a power unit 7 in a casing.

The cartridge accommodation rack 2 has the configuration which is described later with reference to FIGS. 1 to 4. The cartridge accommodation rack 2 stores a number of cartridges 20 (see FIG. 3) which accommodate magnetic tapes, for example, as storage media. In the following, the cartridge accommodation rack 2 may be simply referred to as the accommodation rack 2.

The robot 3 has a hand mechanism 3a which is described later with reference to FIG. 6. The robot 3 transports a predetermined cartridge 20 between the accommodation rack 2 and the recording/reproducing device 4 while holding the cartridge 20 with the hand mechanism 3a.

The recording/reproducing device 4 is a tape drive unit which performs writing/reading of data against the recording medium in the cartridge 20 inserted by the robot 3.

The operational panel 5 is operated by an operator etc. the like and performs a variety of settings and directions against the apparatus control circuit 6.

The apparatus control circuit 6 performs control of the robot 3 and the recording/reproducing device 4 in accordance with the setting and direction by the operational panel 5, a direction and access request from a host which is not illustrated, sensing result of a position and posture of the robot 3 and the like.

The power unit 7 performs power supply to the robot 3, the recording/reproducing device 4, the operational panel 5 and the apparatus control circuit 6.

When the access request for a cartridge 20 is received from the host, the library apparatus 1 operates as follows. The robot 3 moves to the accommodation rack 2 which stores the cartridge 20 and positions the hand mechanism 3a of the robot 3 at a cell 21 which accommodates the cartridge 20 (see FIGS. 1 to 4). Then, the robot 3 transports the cartridge 20 to the recording/reproducing device 4 in the state of holding with the hand mechanism 3a and inserts the cartridge 20 into the recording/reproducing device 4. A process is performed against the storage medium in the cartridge 20 with the recording/reproducing device 4. After the process is completed, the cartridge 20 is ejected from the recording/reproducing device 4 and is held by the hand mechanism 3a of the robot 3 once more. Then, the cartridge 20 is transported to the accommodation rack 2 by the robot 3 and is accommodated in the cell of a predetermined position.

In the library apparatus 1 of the present embodiment, the accommodation rack 2, the robot 3 and the recording/reproducing device 4 are arranged as illustrated in FIGS. 1 to 8 so that the hand mechanism 3a can be accurately positioned against each cell of the accommodation rack 2 and the recording/reproducing device 4 as objective targets.

Figure 2:
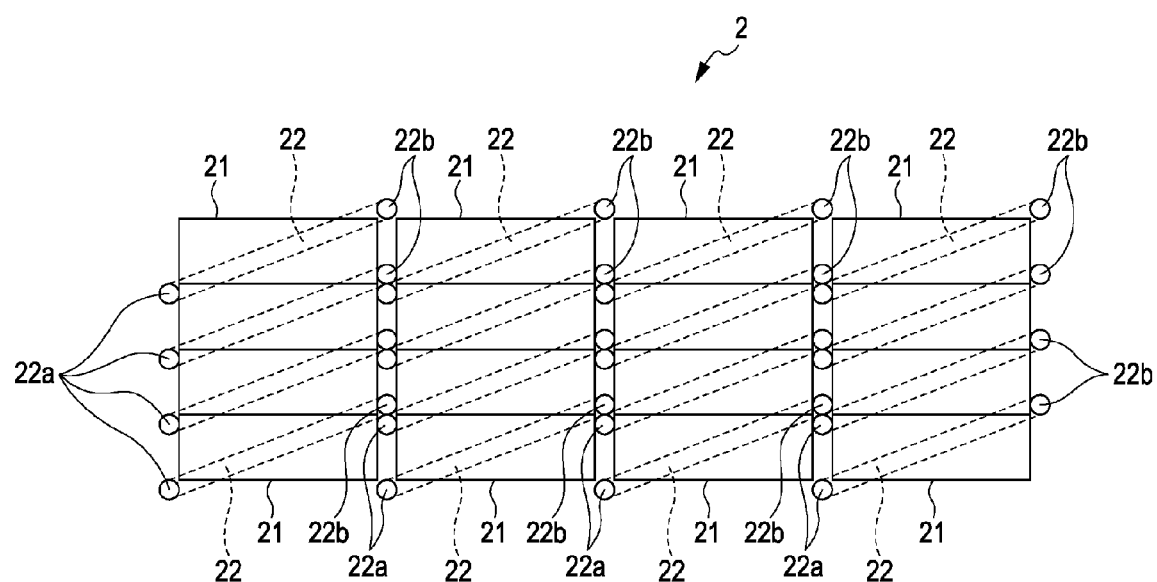
FIG. 2 is a front view of the cartridge accommodation rack of FIG. 1.
Figure 3:
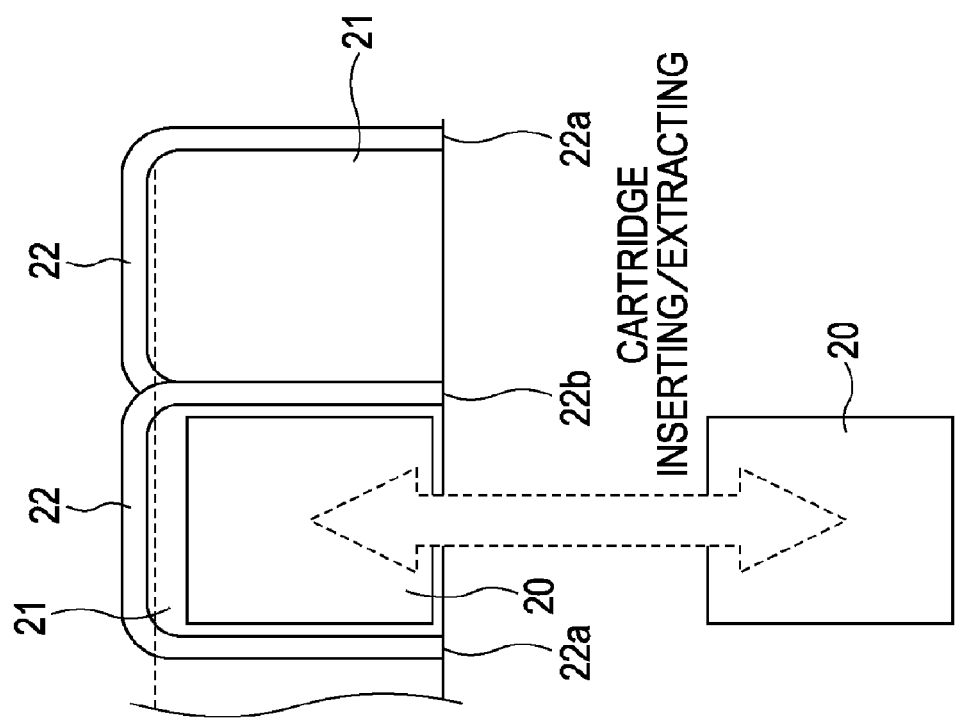
FIG. 3 illustrates the configuration of each cell at the cartridge accommodation rack of FIG. 1.

Next, the accommodation rack 2 is described with reference to FIGS. 1 to 4. As illustrated in FIGS. 1 to 3, the cells 21 in which the cartridge 20 is respectively accommodated by being inserted are arranged longitudinally and laterally at the accommodation rack 2. A cable-shaped light transmission member 22 such as a light pipe and an optical fiber is attached to each cell 21. When light from the later-mentioned robot 3 is received at one end surface 22a as a light receptor of the objective target side, the light transmission member 22 transmits the light internally and emits the light to the outside of the cell 21 from the other end surface 22b as a light emitter of the objective target side.

The light receptor 22a and the light emitter 22b of the light transmission member 22 are arranged at the corners on respective diagonal lines of the cartridge entry frontage of each cell 21. Specifically, the light receptor 22a and the light emitter 22b are arranged so as to be opposed to a light emitter 31a and a light receptor 31b of the hand mechanism 3a side (see FIG. 6) when the hand mechanism 3a of the robot 3 is accurately positioned at the cell 21.

The light transmission member 22 is efficiently arranged by being passed through clearance between the cells 21 and being routed to the back surface of the cells 21 in the accommodation rack 2. Then, the light receptor 22a and the light emitter 22b of both sides thereof are arranged on the diagonal line of the cartridge entry frontage.

Figure 4:
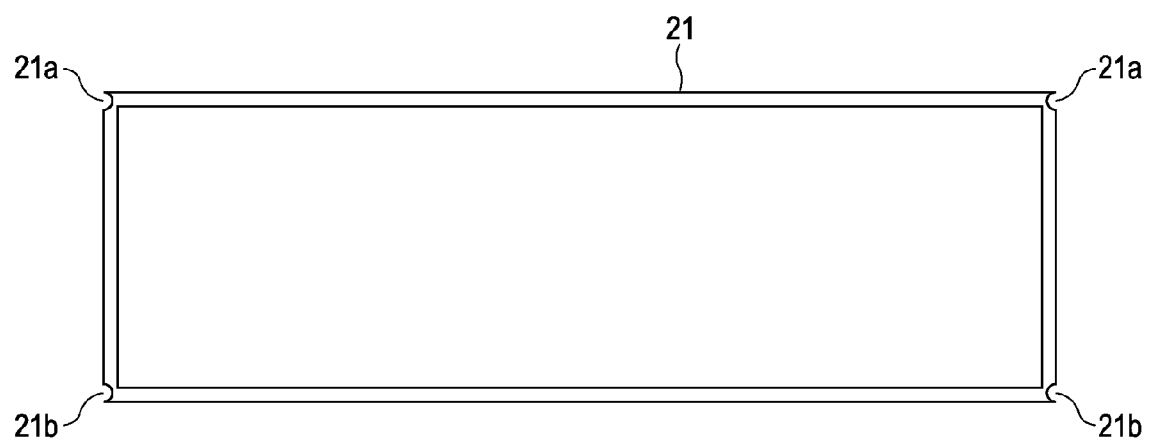
FIG. 4 illustrates the shape of each cell at the cartridge accommodation rack of FIG. 1.

Here, as illustrated in FIG. 4, for example, it is also possible to form concave portions 21a, 21b into which the light transmission member 22 is embedded on the outer surface of each cell 21 outer frame so that the light receptor 22a and the light emitter 22b of the both sides of the light transmission member 22 are accurately arranged. By connecting the cells 21 with embedding the light transmission member 22 into the concave portion 21a, the light receptor 22a of the light transmission member 22 is introduced between the concave portions 21a of the cells 21 and is accurately positioned. Similarly, by connecting the cells 21 with embedding the light transmission member 22 into the concave portion 21b, the light emitter 22b of the light transmission member 22 is introduced between the concave portions 21b of the cells 21 and is accurately positioned. Accordingly, at each cell 21, the light receptor 22a and the light emitter 22b of the light transmission member 22 are respectively arranged at predetermined positions to be respectively opposed to the light emitter 31a and the light receptor 31b of the hand mechanism 3a side.

Figure 5:
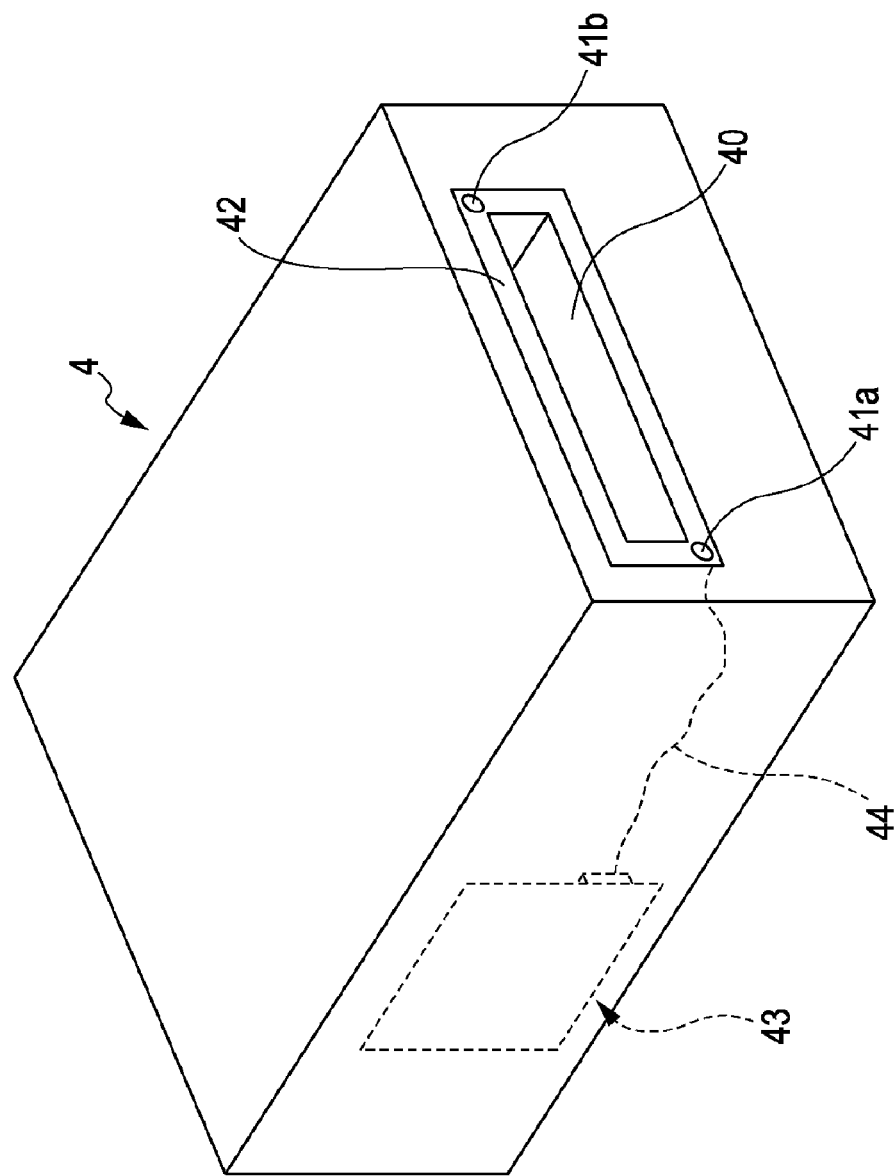
FIG. 5 illustrates a recording/reproducing device as an objective target for positioning of the robot of the present embodiment.

Next, the configuration of the recording/reproducing device 4 is described with reference to FIG. 5 and FIG. 7. As illustrated in FIG. 5 and FIG. 7, the recording/reproducing device 4 includes a light reception element 41a as a light receptor of the objective target side, a light emission element 41b as a light emitter of the object target side, and a signal processing circuit unit 43 which is connected to those elements 41a, 41b via signal lines 44, 45. Here, since the structure and configuration of the periphery of a cartridge entry frontage 40 are complicated and thus unlike the cell 21, it is difficult to provide the light transmission member 22, the recording/reproducing device 4 adopts the light emission and reception system which is constituted with the elements 41a, 41b and the signal processing circuit unit 43.

The light reception element 41a receives light from the light emitter 31a of the robot side while being opposed to the light emitter 31a of the robot side when the hand mechanism 3a is positioned at the objective target 4, and then, notifies the light reception state thereof to the signal processing circuit unit 43 via the signal line 44. When the reception of the light by the light reception element 41a is detected via the signal line 44, the signal processing circuit unit 43 functions as a light emission control unit so that the light emission element 41b is controlled to emit light via the signal line 45. Then, the light emission element 41b emits light such as infrared light to the outside of the recording/reproducing device 4. Namely, the signal processing circuit unit 43 performs the control via the signal lines 44, 45 so that the light emission element 41b does not emit light when the light reception element 41a does not receive light while the light emission element 41b emits light when the light reception element 41a receives light.

The light reception element 41a and the light emission element 41b are arranged at the corners on a diagonal line of the cartridge entry frontage 40 of the recording/reproducing device 4. Specifically, the light reception element 41a and the light emission element 41b are arranged so as to be opposed respectively to the light emitter 31a and the light receptor 31b of the hand mechanism 3a side when the hand mechanism 3a of the robot 3 is accurately positioned to the recording/reproducing device 4.

Further, the light reception element 41a and the light emission element 41b are covered by a mask plate 42 as illustrated in FIG. 5 and FIG. 7. The mask plate 42 has circular light penetration holes 42a, 42b respectively at the positions corresponding to the light reception element 41a and the light emission element 41b. The positioning accuracy of the hand mechanism 3a against the recording/reproducing device 4 can be adjusted by reducing the diameters of these light penetration holes 42a, 42b.

Here, it is also possible that the light penetration holes 42a, 42b are oval-shaped instead of being circular. In this case, the light penetration hole 42b is oval-shaped so that the longitudinal diameter thereof is perpendicular to the direction of the longitudinal diameter of the light penetration hole 42a. The light toward the light reception element 41a and the light from the light emission element 41b are respectively narrowed by the oval-shaped light penetration holes 42a, 42b so as to adjust the positioning accuracy in the longitudinal direction and the lateral direction. Accordingly, the positioning accuracy of the hand mechanism 3a against the recording/reproducing device 4 can be further improved.

It is also possible that the light receptor 22a and the light emitter 22b of each cell 21 are covered by a mask plate which is similar to the abovementioned mask plate 42 having the light penetration holes 42a, 42b. In this case, the positioning accuracy of the hand mechanism 3a and the positioning accuracy in the longitudinal direction and the lateral direction against each cell 21 can be adjusted as well.

Next, the configuration of the hand mechanism 3a of the robot 3 is described with reference to FIGS. 6 to 8. Here, FIG. 6 is a perspective view which schematically illustrates the hand mechanism 3a of the robot 3. FIG. 7 is a plane view which schematically illustrates the configuration of the light emission and reception system of the hand mechanism 3a of FIG. 6. FIG. 8 is a front view which illustrates the shape of the mask plate 32 of the FIG. 6 and FIG. 7.

The hand mechanism 3a belongs to the robot 3 and performs inserting and extracting of the cartridge 20 stored in the accommodation racks 2 which are arranged respectively at two bilateral surfaces as illustrated in FIG. 9 and inserting and extracting of the cartridge 20 which is processed by the recording/reproducing device 4. The hand mechanism 3a is moved in the horizontal direction and the vertical direction with a moving mechanism which is not illustrated and is rotated around the vertical axis in the range of 360 degrees with a rotationally driving mechanism which is not illustrated. Further, fine adjustment of inclination of the hand mechanism 3a is performed by an adjusting mechanism which is not illustrated. With these mechanisms, the hand mechanism 3a is positioned against each cell 21 or the recording/reproducing device 4 as the objective target so as to be opposed thereto.

Figure 6:
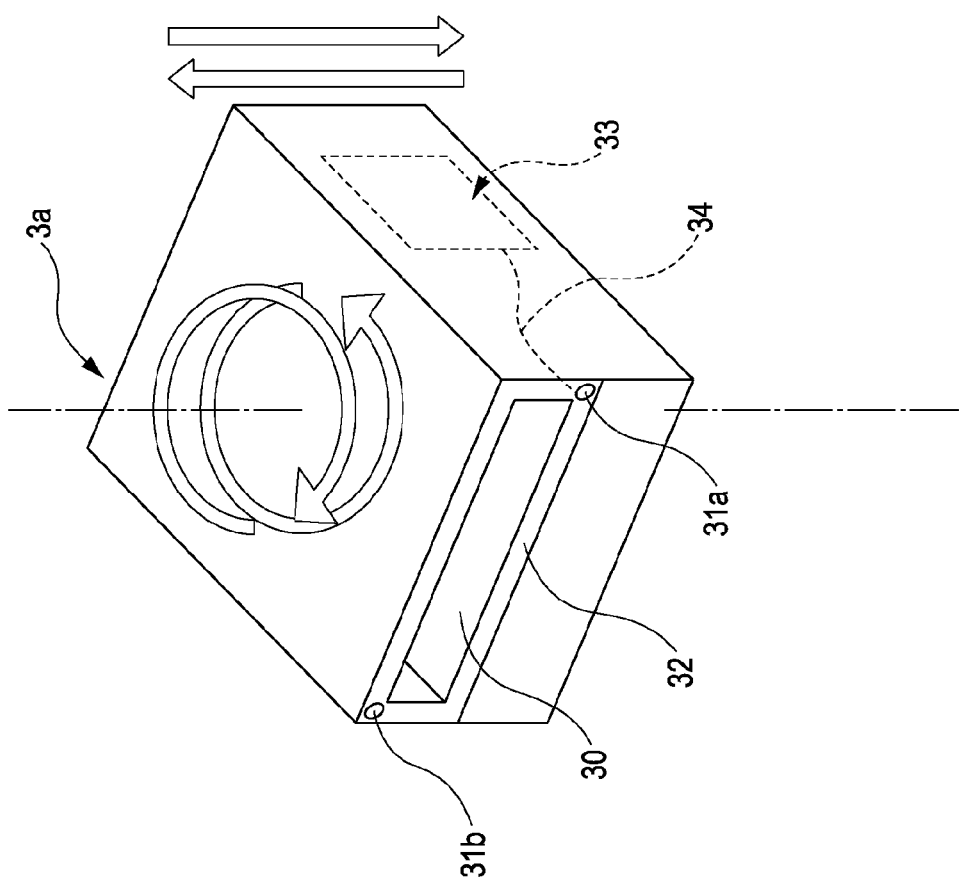
FIG. 6 illustrates a hand mechanism of the robot of the present embodiment.

As illustrated in FIG. 6 and FIG. 7, the hand mechanism 3a includes the light emission element 31a as the light emitter of the robot side and the light reception element 31b as the light receptor of the robot side. The light emission element 31a is controlled in an on-off manner by a control circuit unit 33 in the hand mechanism 3a via a signal line 34. Then, the light emission element 31a is opposed to the light receptor 22a, 41a of the objective target side when the hand mechanism 3a is positioned at the objective target 21, 4 and emits light such as infrared light to the light receptor 22a, 41a of the objective target side. The light reception element 31b is opposed to the light emitter 22b, 41b of the objective target side when the hand mechanism 3a is positioned at the objective target 21, 4 and receives light from the light emitter 22b, 41b of the objective target side. Then, the light reception element 31b notifies the light reception state to the control circuit unit 33 via a signal line 35.

The light emission element 31a and the light reception element 31b are arranged at the corners on a diagonal line of a cartridge entry frontage 30 of the hand mechanism 3a. Specifically, the light emission element 31a and the light reception element 31b are arranged so as to be opposed respectively to the light receptor 22a, 41a and the light emitter 22b, 41b when the hand mechanism 3a of the robot 3 is accurately positioned at the objective target 21, 4.

Further, the light emission element 31a and the light reception element 31b are covered by the mask plate 32 as illustrated in FIGS. 6 to 8. The mask plate 32 has circular light penetration holes 32a, 32b (see solid line circles in FIG. 8) respectively at the positions corresponding to the light emission element 31a and the light reception element 31b. The positioning accuracy of the hand mechanism 3a against the objective target 21, 4 can be adjusted by reducing diameters of these light penetration holes 32a, 32b.

Here, it is also possible that the light penetration holes 32a, 32b are oval-shaped as illustrated with dotted lines in FIG. 8 instead of being circular. In this case, the light penetration hole 32b is shaped oval so that the longitudinal diameter thereof is perpendicular to the direction of the longitudinal diameter of the light penetration hole 32a. The light from the light emission element 31a and the light toward the light reception element 31b are respectively narrowed by the oval-shaped light penetration holes 32a, 32b so as to adjust the positioning accuracy in the longitudinal direction and the lateral direction. Accordingly, the positioning accuracy of the hand mechanism 3a against the objective target 21, 4 can be further improved.

On the other hand, the control circuit unit 33 controls the operation of the robot 3 including the hand mechanism 3a. The control circuit unit 33 includes a CPU (Central Processing Unit) which is not illustrated and a storage portion (for example, a RAM (Random Access Memory) or a ROM (Read Only Memory)) which is not illustrated.

The control circuit unit 33 functions as a positioning control unit which performs positioning control of the hand mechanism 3a against the objective targets 21, 4 so that the light receptor 31b of the robot side receives light from the light emitter 22b, 41b of the objective target side. The function of the positioning control unit is performed utilizing a storage area of the RAM as a working area by execution of the CPU with a predetermined program which is previously stored at the ROM, for example.

Specifically, the function of the control circuit unit 33 as the positioning control unit is performed as follows when the positioning control of the hand mechanism 3a against each cell 21 of the accommodation rack 2 is performed.

As described later with reference to FIGS. 10 to 13, the control circuit unit 33 performs the positioning of the hand mechanism 3a against a reference cell (see cell 00 in FIG. 10) as the first objective target among a plurality of the cells 21 when the library apparatus 1 is powered on. The control circuit unit 33 registers the reference cell position obtained with the positioning at the storage portion as the first measured position. Further, the control circuit unit 33 performs correction of the design position of the cells 21 other than the reference cell based on the difference between the first measured position and the design position of the reference cell previously stored at the storage portion. The abovementioned process is an initialization process which is described later with reference to FIG. 13. Then, the control circuit unit 33 performs the positioning control of the hand mechanism 3a against the cell 21 other than the reference cell based on the corrected design position.

Further, as described later with reference to FIGS. 10 to 12 and FIG. 14, after the initialization process, the control circuit unit 33 performs positioning of the hand mechanism 3a against the second cell (for example, see cell (1) in FIG. 10) as the second objective target other than the reference cell based on the corrected design position. The control circuit unit 33 registers the second cell position obtained with the positioning at the storage portion as the second measured position. Then, the control circuit unit 33 performs further correction of the corrected design position of the cells 21 other than the reference cell and the second cell based on the difference between the corrected design position of the second cell and the second measured position. Subsequently, the control circuit unit 33 performs the positioning control of the hand mechanism 3a against the cell 21 other than the reference cell and the second cell based on the further corrected design position.

Here, it is also possible that the function as the positioning control unit of the control circuit unit 33 is provided to the abovementioned apparatus control circuit 6 instead of the control circuit unit 33 for the hand mechanism 3a. The apparatus control circuit 6 has at least a CPU and a storage portion.

[2] Operation of the Present Embodiment

Next, the positioning control of the library apparatus 1 as configured as mentioned above is described more specifically with reference to FIGS. 10 to 14.

First, an example of the accommodation rack 2, which is to be a positioning control object, is described with reference to FIG. 10. As illustrated in FIG. 10, the accommodation rack 2, which is to be the positioning control object, is configured to be similar to the accommodation rack 100 of FIG. 15. The accommodation rack 2 is constituted with a cell group of cells 21 which are pieces of five multiplied by six by connecting five sets of subunits in the lateral direction (i.e., the horizontal direction), the subunit being arranged by layering and integrating six cells 21 in the longitudinal direction (i.e., the vertical direction). As illustrated in FIG. 10, the thirty pieces of the cells 21 are respectively given cell numbers 00 to 29. The cell number is utilized for specifying each of the thirty pieces of the cells 21. Further, as illustrated in FIG. 10, the five pieces of the subunits are also respectively given subunit numbers 1 to 5. The subunit number is utilized for specifying each of five pieces of the subunits. Here, the reference cell (i.e., the first objective target) which is utilized for the initialization process after the powering is to be the cell of cell number 00.

Next, data to be stored at the storage portion of the control circuit unit 33 or the apparatus control circuit 6 which functions as the positioning control unit during the positioning process of the present embodiment are described with reference to FIG. 11. The data at an initial state when powering are illustrated in FIG. 11.

Figure 11:
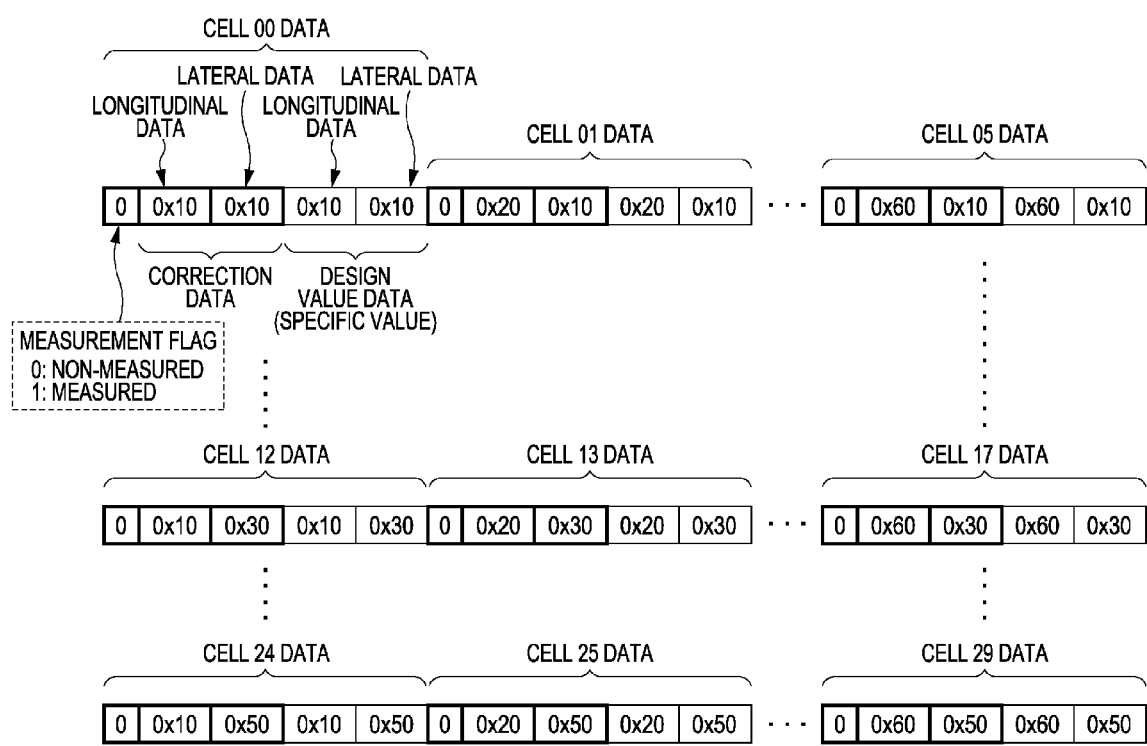
FIG. 11 illustrates data stored at a storage portion at a positioning process of the present embodiment.

As illustrated in FIG. 11, cell data for each of the cells of cell numbers 00 to 29 are stored at the storage portion. Each cell data includes design value data, correction data and a measurement flag. The cell xx data in FIG. 11 denotes the cell data of the cell of cell number xx.

Here, the design value data are specific coordinates data which indicate the position to which the cell is designed to be arranged. The correction data are coordinates data which indicates the corrected position or the measured position which is described later.

The measurement flag is set to be "1" in a case that the coordinates data stored as the correction data are the measured coordinates data obtained by actual positioning of the hand mechanism 3a at the cell 21 and is maintained to be "0" in a case that the coordinates data stored as the correction data are not the measured coordinates data.

The coordinates data as the design value data and the coordinates data as the correction data are based on a coordinate system. For example, in the coordinate system, the origin point is to be point O in FIG. 10 at the right-bottom, the longitudinal direction axis is to be a vertical axis passing through the origin point O, and the lateral direction axis is to be a horizontal axis passing through the origin point O. Namely, each of the coordinates data has longitudinal direction data and lateral direction data based on the coordinate system, and then, corresponds to the center coordinates of the cartridge entry frontage of each cell, for example.

As illustrated in FIG. 11, since the positioning of the hand mechanism 3a at the cell is not performed yet at the time of starting the initialization process after powering, all of the measurement flags are set to be "0". Further, the design value data of each cell previously stored at a non-volatile memory (of which illustration is abbreviated) are copied as the correction data and the design value data for each of the cells of cell numbers 00 to 29.

Next, a specific example of updating of the cell data is described with reference to FIG. 10 and FIG. 12. The measurement flag and the correction data of each cell data are indicated in FIG. 12. The cell xx correction value denotes the correction value of the cell of cell number xx in FIG. 12.

In the apparatus initialization process, the hand mechanism 3a is positioned at the reference cell (the cell of cell number 00) based on the design value data of the reference cell stored at the storage portion. At that time, in a case that the reference cell cannot be detected due to deformation and the like, namely, in a case that the light receptor 31b of the robot side cannot receive light from the light emitter 22b of the objective target side, even when the hand mechanism 3a is positioned to the position of the design value data, the control circuit unit 33 performs the following control. The control circuit unit 33 slightly shifts the hand mechanism 3a in the horizontal direction and the vertical direction within the range of assumed deviation amount, for example, by the minimum length unit capable of position control. With such operation, the control circuit unit 33 performs the positioning control of the hand mechanism 3a against the reference cell so that the light receptor 31b of the robot side receives light from the light emitter 22b of the objective target side. Here, in a case that the reference cell is detected with the positioning based on the design value data, the design value data is regarded as the measured position as it is. Then, the measurement flag of the reference cell is set to be "1".

When the hand mechanism 3a is positioned at the reference cell so that the light receptor 31b of the robot side receives light from the light emitter 22b of the objective target side with this positioning control, the measured position of the reference cell is obtained and stored as the correction data of the reference cell (i.e., cell 00). Namely, the measurement flag of the reference cell is set to be "1" while the correction data of the reference cell of cell number 00 is corrected and updated (see updating (1) in FIG. 12). With the updating (1), the measured position of the reference cell is assumed to be shifted from the design value, for example, plus nine points in the longitudinal direction and plus two points in the lateral direction. Here, one point denotes the minimum length unit which is capable of position control.

In a case that deviation occurs at the reference cell, it is considered that there is a high possibility of the entire accommodation rack 2 being shifted by the same amount as the deviation amount of the reference cell. The correction data of all of the cells except for the reference cell (i.e., the cells of cell numbers 01 to 29) are corrected in accordance with the deviation amount of the reference cell. Namely, the data calculated with the design value data which is the current correction data by adding nine points and two points respectively to the longitudinal direction data and the lateral direction data is stored as the corrected position (see updating (2) in FIG. 12). Since the cell positions of cell numbers 01 to 29 are not measured in this case, the measurement flags are maintained as "0".

Figure 10:
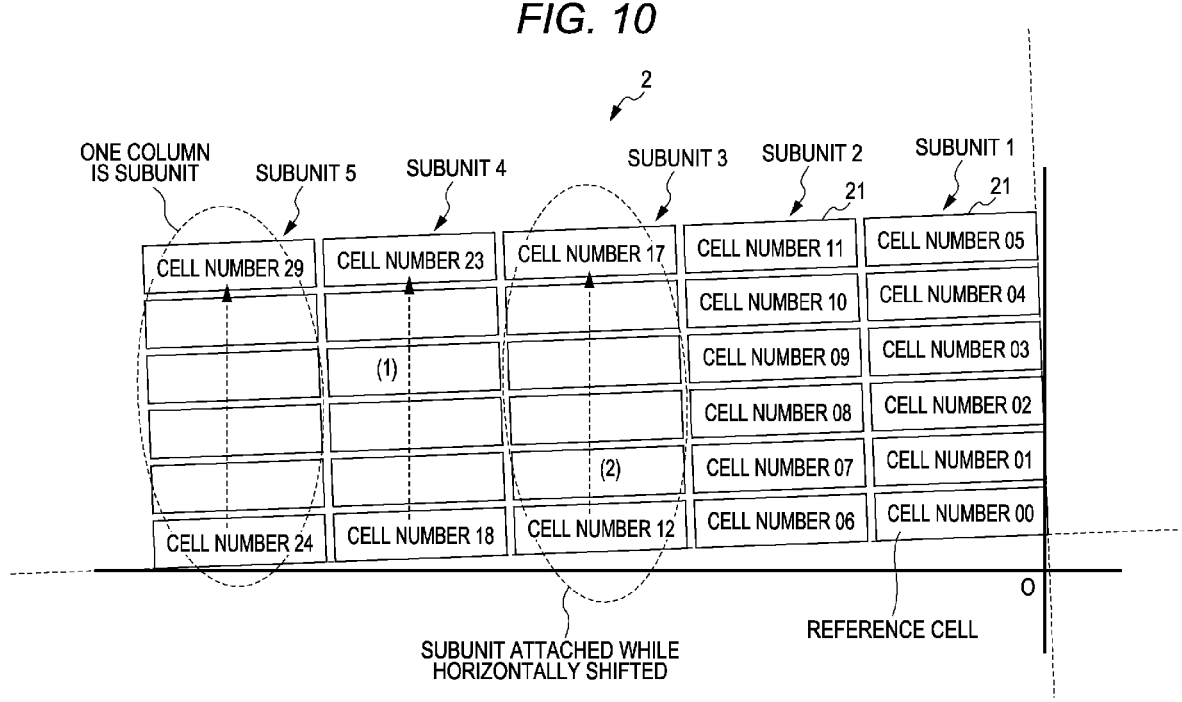
FIG. 10 illustrates an example of an accommodation rack for describing operation of the present embodiment.

In the subsequent operation, in a case that the hand mechanism 3a is positioned at the cell (1) in FIG. 10 (i.e., the cell of cell number 21), for example, the hand mechanism 3a is positioned at the cell (1) based on the correction data "0x49" and "0x42" which are obtained at the updating (2). When the cell (1) is detected in this state, the current correction data are regarded as the measured position and the measurement flag of the cell (1) is set to be "1". However, there is a case that the cell (1) cannot be detected even with the positioning control based on the correction data of the updating (2) in a state that the accommodation rack 2 or the apparatus casing including the accommodation rack 2 is deformed. Here, it is assumed that the cell (1) cannot be detected, namely, that the light receptor 31b of the robot side cannot receive light from the light emitter 22b of the objective target side.

In this case as well, similar to the abovementioned, the control circuit unit 33 slightly shifts the hand mechanism 3a in the horizontal direction and the vertical direction within the range of assumed deviation amount, for example, by the minimum length unit capable of position control. With such operation, the control circuit unit 33 performs the positioning control of the hand mechanism 3a against the cell (1) so that the light receptor 31b of the robot side receives light from the light emitter 22b of the objective target side. When the hand mechanism 3a is positioned at the cell (1) so that the light receptor 31b of the robot side receives light from the light emitter 22b of the objective target side with this positioning control, the measured position of the cell (1) is obtained and stored as the correction data of the cell (1). Namely, the measurement flag of the cell (1) is set to be "1" while the correction data of the cell (1) of cell number 21 is corrected and updated (see updating (3) in FIG. 12). With the updating (3), the measured position of the cell (1) is assumed to be shifted from the correction data of the updating (2), for example, minus six points in the longitudinal direction and zero point in the lateral direction.

In the present embodiment, the correction amounts of the cells except for the reference cell and the cell (1) (i.e., the cells of cell numbers 01 to 20 and 22 to 29) are calculated based on the correction data (the measured position) of the reference cell, the correction data (the measured position) of the cell (1) and the abovementioned difference values of minus six points and zero point. Namely, the measured position of the cell (1) of cell number 21 has difference of minus six points in the longitudinal direction against the correction data which is obtained at the updating (2). As illustrated in FIG. 10, the cell (1) belongs to the subunit 4 being the fourth from the subunit 1 to which the reference cell belongs. Therefore, assumed that deformation is generated with an even ratio at the accommodation rack 2, the deviation generated between one set of subunits can be estimated to be minus two points. Based on the above, it is estimated that the deviation amounts in the longitudinal direction of the subunits 1 to 5 are respectively 0, −2, −4, −6 and −8. Then, based on these estimated values, the correction data of the cells except for the reference cell and the cell (1) (i.e., the cells of cell numbers 01 to 20 and 22 to 29) are corrected and updated (see updating (4) in FIG. 12). Since the cell positions of cell numbers 01 to 20 and 22 to 29 are not measured in this case, the measurement flags are maintained as "0" as well.

Subsequently, in a case that the hand mechanism 3*a* is positioned at the cell (2) in FIG. 10 (i.e., the cell of cell number 13), for example, the hand mechanism 3*a* is positioned at the cell (2) based on the correction data "0x25" and "0x32" which are obtained at the updating (4). When the cell (2) is detected in this state, the current correction data is regarded as the measured position and the measurement flag of the cell (2) is set to be "1". However, there is a case that the cell (2) cannot be detected even with the positioning control based on the correction data of the updating (4). Here, it is also assumed that the cell (2) cannot be detected, namely, that the light receptor 31*b* of the robot side cannot receive light from the light emitter 22*b* of the objective target side.

In this case as well, similar to the abovementioned, the control circuit unit 33 slightly shifts the hand mechanism 3*a* in the horizontal direction and the vertical direction within the range of assumed deviation amount, for example, by the minimum length unit capable of position control. With such operation, the control circuit unit 33 performs the positioning control of the hand mechanism 3*a* against the cell (2) so that the light receptor 31*b* of the robot side receives light from the light emitter 22*b* of the objective target side. When the hand mechanism 3*a* is positioned at the cell (2) so that the light receptor 31*b* of the robot side receives light from the light emitter 22*b* of the objective target side with this positioning control, the measured position of the cell (2) is obtained and stored as the correction data of the cell (2). Namely, the measurement flag of the cell (2) is set to be "1" while the correction data of the cell (2) of cell number 13 is corrected and updated (see updating (5) in FIG. 12). With the updating (5), the measured position of the cell (2) is assumed to be shifted from the correction data of the updating (4), for example, zero point in the longitudinal direction and minus two points in the lateral direction.

Figure 15:
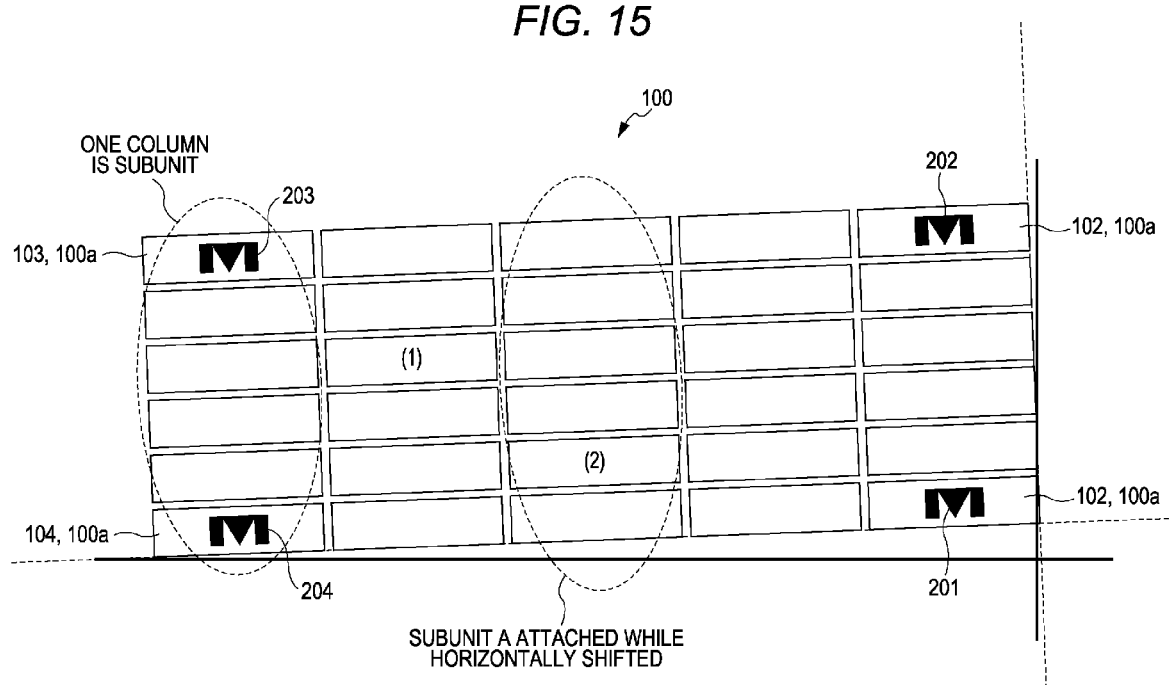
FIG. 15 illustrates an example of an accommodation rack for describing an initialization process and a positioning process of a robot against an accommodation rack of a general library apparatus.

At this time, with the accommodation rack 2 which is configured as illustrated in FIG. 10, assuming that there is a case that one subunit is integrally shifted similarly to the accommodation rack 100 described with reference to FIG. 15, the correction amounts of the non-measured cells in the subunit 3 to which the cell (2) belongs are calculated. Here, the correction by the deviation amount of the cell (2), namely, the correction of shifting by two points minus in the lateral direction (see updating (6) in FIG. 12) is performed on the correction data of the non-measured cells of which measurement flags are "0" in the subunit 3 (i.e., cell numbers of 12, and 14 to 17). Since the cell positions of cell numbers 12 and 14 to 17 are not measured in this case, the measurement flags are maintained as "0" as well. With such correction updating for each subunit, it can be easily performed to take measures against a case that the subunit 3 is shifted alone in the right-side direction as illustrated in FIG. 10, for example.

Subsequently, the correction updating according to the position data of each cell is performed at the storage portion while the positioning control of the hand mechanism 3*a* against a cell is performed similarly. Thus, the hand mechanism 3*a* is positioned to a non-measured cell and the measured position of the non-measured cell is obtained. In a case that there is difference between the measured position and the correction data, the correction updating based on the difference is performed on the non-measured cells of which measurement flag are "0". On the other hand, the correction updating is not performed on the measured cells of which measurement flag are "1".

Further, in a case that positioning is performed once more against the cell to which positioning is once performed, the following process is performed. Comparing the latest measured position of the cell obtained with the latest positioning to the measured position which is previously obtained (i.e., the correction data), the latest measured position is stored at the storage portion as the latest correction data when there is difference between these positions.

Although a case that the correction data is for the measured position or the corrected position of the cell is described with FIG. 11 and FIG. 12, it is not limited to this. For example, the correction data of each cell may be the difference value between the measured position of the cell and the design value data of the cell or the difference value between the abovementioned corrected position of the cell and the design value data of the cell. In this case, the positioning control of the hand mechanism 3*a* against the corresponding cell is performed based on the position of the offset design value data by adding the difference value which is the correction data for the cell to the design value data of the cell when performing the positioning control of the hand mechanism 3*a* against each cell.

In the following, process procedure of the present embodiment is described with reference to FIG. 13 and FIG. 14. The procedure of the initialization process after powering in the present embodiment is described with reference to a flowchart of operations S11 to S18 of FIG. 13.

In the apparatus initialization process, first, the hand mechanism 3*a* is positioned at the reference cell based on the design value data of the reference cell stored at the storage portion in operation S11, as described above. In a case that the reference cell cannot be detected even when the hand mechanism 3*a* is positioned to the position of the design value data due to deformation and the like, namely, in a case that the light receptor 31*b* of the robot side cannot receive light from the light emitter 22*b* of the objective target side (i.e., NO in operation S12), the control circuit unit 33 performs following control. The control circuit unit 33 slightly shifts the hand mechanism 3*a* in the horizontal direction and the vertical direction within the range of assumed deviation amount, for example, by the minimum length unit capable of position control (i.e., YES in operations S13 and S14).

When the hand mechanism 3*a* is positioned at the reference cell so that the light receptor 31*b* of the robot side receives light from the light emitter 22*b* of the objective target side with the abovementioned control (i.e., YES in operation S12), the process proceeds to operation S16. In operation S16, the measured position of the reference cell is obtained and stored as the correction data of the reference cell. Namely, the measurement flag of the reference cell is set to be "1" while the correction data of the reference cell is corrected and updated. The process of operation S16 corresponds to the updating (1) of FIG. 12. Then, the difference between the measured position (i.e., the correction data) of the reference cell and the design value data of the reference cell is calculated in operation S17. The difference is added to the correction data (i.e., the design value data) of all of the cells except for the reference cell and updating of the correction data is performed in operation S18. The process of operation S18 corresponds to the updating (2) in FIG. 12.

In a case that the position of the hand mechanism 3a exceeds the range of the assumed deviation amount (i.e., NO in operation S14) due to shifting of the position of the hand mechanism 3a with the process of operation S13, the control circuit unit 33 recognizes that the positioning of the hand mechanism 3a against the reference cell cannot be performed. Then, the control circuit unit 33 performs an error process such as notification thereof to an operator in operation S15.

Figure 13:
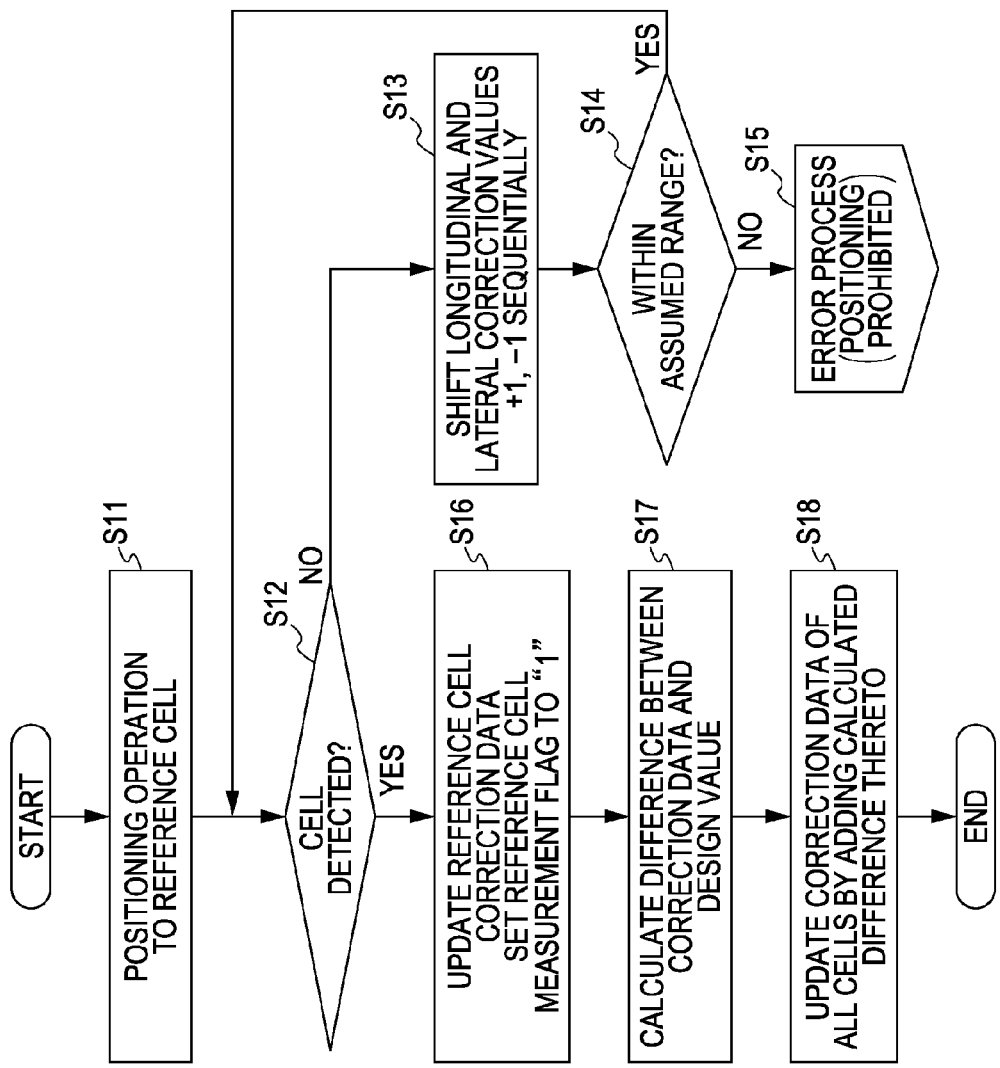
FIG. 13 is a flowchart which describes initialization process procedure after powering of the present embodiment.
Figure 14:
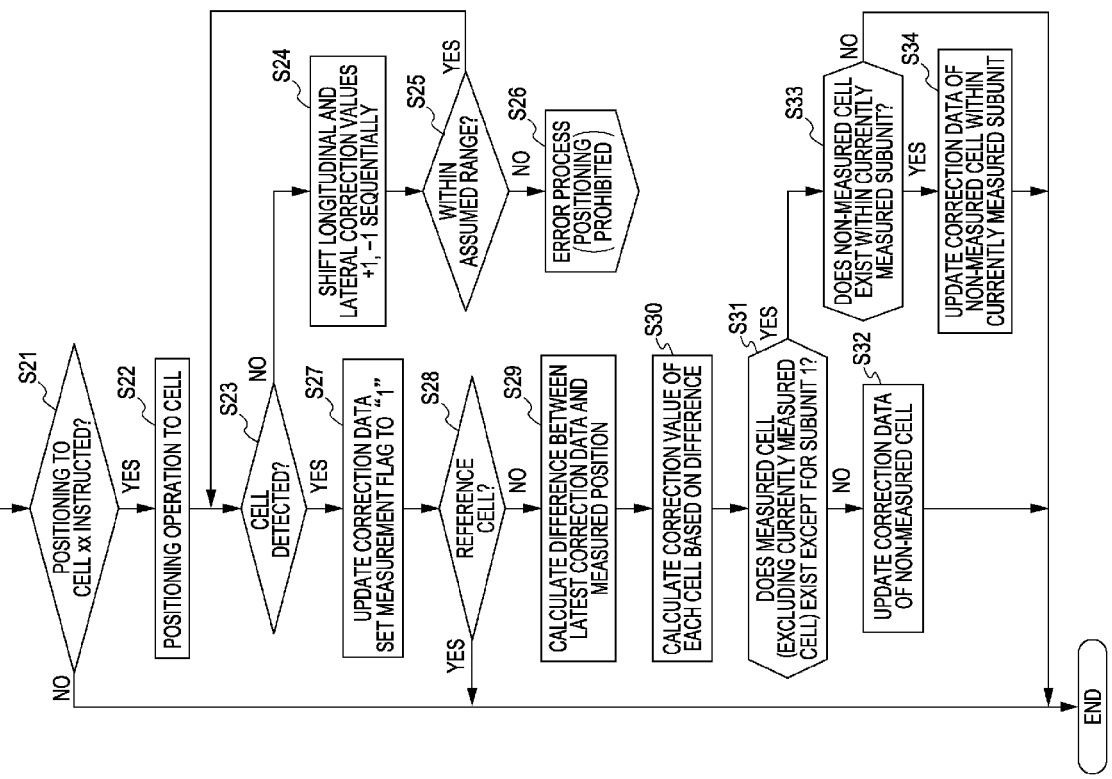
FIG. 14 is a flowchart which describes the positioning process procedure at the operation after the initialization process of FIG. 13.

Next, process procedure of the positioning during operations after the initialization process in FIG. 13 is described with reference to a flowchart of operations S21 to S34 of FIG. 14.

After the initialization process as mentioned above, when an instruction of the positioning at the cell xx (i.e., cell number xx) is received (i.e., YES in operation S21), the control circuit unit 33 positions the hand mechanism 3a at the cell xx in operation S22 based on the correction data updated in operation S18. In a case that the cell xx cannot be detected due to deformation and the like even when the hand mechanism 3a is positioned to the position of the correction data of the cell xx, namely, in a case that the light receptor 31b of the robot side cannot receive light from the light emitter 22b of the objective target side (i.e., NO in operation S23), the control circuit unit 33 performs the following control. The control circuit unit 33 slightly shifts the hand mechanism 3a in the horizontal direction and the vertical direction within the range of assumed deviation amount, for example, by the minimum length unit capable of position control (i.e., YES in operations S24 and S25).

When the hand mechanism 3a is positioned at the cell xx so that the light receptor 31b of the robot side receives light from the light emitter 22b of the objective target side with the abovementioned control (i.e., YES in operation S23), the process proceeds to operation S27. In operation S27, the measured position of the cell xx is obtained and stored as the correction data of the cell xx. Namely, the measurement flag of the cell xx is set to "1" while the correction data of the cell xx is corrected and updated. The process of operation S27 corresponds to the updating (3) and (5) of FIG. 12.

In a case that the position of the hand mechanism 3a exceeds the range of the assumed deviation amount (i.e., NO in operation S25) due to shifting of the position of the hand mechanism 3a with the process of operation S24, the control circuit unit 33 recognizes that the positioning of the hand mechanism 3a against the cell xx cannot be performed. Then, the control circuit unit 33 performs the error process such as notification thereof to the operator in operation S26.

When the cell xx is the reference cell (i.e., xx=00, YES in operation S28), the process ends. On the other hand, when the cell xx is not the reference cell (i.e., NO in operation S28), the process proceeds to operation S29. The difference between the latest correction data (i.e., the corrected position) and the current measured position is calculated in operation S29, and then, the correction value of each cell is calculated based on the difference in operation S30.

Subsequently, it is determined whether or not the measured cell exists among the cells excluding the cells in the subunit 1 to which the reference cell belongs and the cell which is the current measurement target in operation S31. When the measured cell does not exist (i.e., NO in operation S31), the correction updating is performed based on the correction value calculated in operation S30 against all of the non-measured cells excluding the cells in the subunit 1 to which the reference cell belongs and the cell which is the current measurement target in operation S32. The process of the operation S32 corresponds to the updating (4) in FIG. 12.

On the other hand, when the measured cell exists (i.e., NO in operation S31), it is determined whether or not the non-measured cell exists in the subunit to which the current measurement targeted cell belongs in operation S33. When the non-measured cell does not exist (i.e., NO in operation S33) the process ends. When the non-measured cell exists (i.e., YES in operation S33), the correction updating against the non-measured cell is performed in operation S34 based on the correction value which is calculated in operation S30. The process of the operation S34 corresponds to the updating (6) in FIG. 12.

Here, when the hand mechanism 3a is accurately positioned at the cell 21, the light emitter 31a and the light receptor 31b of the hand mechanism 3a are arranged to be opposed respectively to the light receptor 22a and the light emitter 22b of the cell 21. In such a state of opposed arrangement, light from the light emitter 31a is received by the light receptor 22a and the light is emitted from the light emitter 22b after being transmitted through the light transmission member 22. Then, the light from the light emitter 22b is received by the light receptor 31b. When the light reception by the light receptor 31b is detected, the control circuit unit 33 determines that the cell 21 is detected, namely, that the hand mechanism 3a is accurately positioned at the cell 21.

The abovementioned processes are for positioning the hand mechanism 3a against each cell 21. The positioning of the hand mechanism 3a against the recording/reproducing device 4 is performed similarly to the positioning against the cell 21. Specifically, design value data or previous measured position data of the center position of the cartridge entry frontage 40 of the recording/reproducing device 4 are previously stored at the storage portion of the control circuit unit 33 or the apparatus control circuit 6. When performing the positioning of the hand mechanism 3a to the recording/reproducing device 4, the design value data or the measured position data stored at the storage portion are read, and then, the hand mechanism 3a is positioned to the recording/reproducing device 4 based on the data.

When the hand mechanism 3a is accurately positioned to the recording/reproducing device 4, the light emitter 31a and the light receptor 31b of the hand mechanism 3a are arranged to be opposed respectively to the light receptor 41a and the light emitter 41b of the recording/reproducing device 4. In such a state of opposed arrangement, light from the light emitter 31a is received by the light receptor 41a and the signal processing circuit unit 43 which detects the light reception by the light receptor 41a controls the light emitter 41b to emit light. Then, the light from the light emitter 41b is received by the light receptor 31b. When the light reception by the light receptor 31b is detected, the control circuit unit 33 determines that the recording/reproducing device 4 is detected, namely, that the hand mechanism 3a is accurately positioned to the recording/reproducing device 4.

At that time, in a case that the recording/reproducing device 4 cannot be detected due to deformation and the like, namely, in a case that the light receptor 31b of the robot side cannot receive light from the light emitter 41b of the objective target side, even when the hand mechanism 3a is positioned to the recording/reproducing device 4 based on the abovementioned data, the control circuit unit 33 performs the following control. The control circuit unit 33 slightly shifts the hand mechanism 3a in the horizontal direction and the vertical direction within the range of assumed deviation amount, for example, by the minimum length unit capable of position control. With such operation, the control circuit unit 33 performs the positioning control of the hand mechanism 3a against the recording/reproducing device 4 so that the light receptor 31b of the robot side receives light from the light emitter 41b of the objective target side.

When the hand mechanism 3a is positioned to the recording/reproducing device 4 so that the light receptor 31b of the robot side receives light from the light emitter 41b of the objective target side with this positioning control, the measured position of the recording/reproducing device 4 is obtained and stored at the storage portion. The stored measured position is utilized for the positioning control of the hand mechanism 3a against the recording/reproducing device 4 from the next time.

[3] Effects of the Present Embodiment

As described above, with the present embodiment, the robot 3 is positioned at the objective target 21, 4 so that the light from the light emitter 31a of the robot side is received by the light receptor 31b of the robot side via the light receptor 22a, 41a of the objective target side and the light emitter 22b, 41b of the objective target side. Accordingly, the robot 3 is capable of being positioned accurately against the objective target 21, 4 without any contact and interference at the objective target 21, 4.

More specifically, in the present embodiment, each cell 21 of the accommodation rack 2 is provided with a position detection mechanism (i.e., the light transmission member 22) which ensures positioning of the hand mechanism 3a and the robot 3 is provided with a position detection portion (i.e., the control circuit unit 33) which corresponds to the position detection mechanism. In a predetermined positioning state, the light emitted from the light emitter 31a of the robot side is received by the light receptor 31b of the robot side via the light receptor 22a of the objective target side, the light transmission member 22 and the light emitter 22b of the objective target side. By performing the positioning control of the hand mechanism 3a to be this light reception state, it is recognized that the robot 3 and the cell 21 are in a positional relationship being capable of passing the cartridge 20. Then, the passing operation of the cartridge 20 is performed by the hand mechanism 3a.

Further, the recording/reproducing device 4 is also provided with a position detection mechanism (i.e., the light receptor 41a, the signal processing circuit unit 43 and the light emitter 41b) which ensures positioning of the hand mechanism 3a and the robot 3 is provided with a position detection portion (i.e., the control circuit unit 33) which corresponds to the position detection mechanism. In a predetermined positioning state, the light emitted from the light emitter 31a of the robot side is received by the light receptor 31b of the robot side via the light receptor 41a of the objective target side, the signal processing circuit unit 43 and the light emitter 41b of the objective target side. By performing the positioning control of the hand mechanism 3a to be such a light reception state, it is recognized that the robot 3 and the recording/reproducing device 4 are in a positional relationship being capable of passing the cartridge 20. Then, the passing operation of the cartridge 20 is performed by the hand mechanism 3a. In this manner, the positioning to the recording/reproducing device 4 can be performed at the same accuracy as the positioning at the cell 21, so that accurate passing of the cartridge 20 can be performed.

Accordingly, in the library apparatus 1, the positioning control of the robot 3 at the cell 21 or the recording/reproducing device 4 can be reliably performed for passing for inserting and extracting of the cartridge 20 with the cell 21 and inserting and ejecting of the cartridge 20 with the recording/reproducing device 4.

Thus, mechanical portions can be prevented from being interfered and broken due to the operation of inserting and extracting of the cartridge 20 and can be prevented from being worn due to the unnecessary operation of inserting and extracting of the cartridge 20. Therefore, the quality of the library apparatus 1 can be remarkably improved. Further, since there is no contact and interference between the robot 3 and the objective target 21, 4 during the retry control, the mechanical portions of the cell 21 side and the hand mechanism 3a can be reliably prevented from being broken. Accordingly, the library apparatus 1 is reliably prevented from being inoperable and being in a situation to cause system-down.

Further, the positioning accuracy of the hand mechanism 3a can be adjusted by arranging the mask plate 32, 42 which has the light penetration holes 32a, 32b, 42a, 42b at the light passing portion between the hand mechanism 3a and the objective target 21, 4 and reducing the diameter of the light penetration holes. The positioning accuracy is increased as the diameter of the light penetration holes becomes small. Further, the positioning accuracy of the hand mechanism 3a and the positioning accuracy in the longitudinal direction and the lateral direction can be adjusted by forming the light penetration holes 32a, 32b, 42a, 42b to be shaped oval as illustrated with dotted lines in FIG. 8. In this case, the positioning accuracy can be improved than in a case of the circular light penetration holes. Here, sufficient effects of improving the positioning accuracy can be obtained even in a case of arranging the oval light penetration holes only at the robot 3 side.

With the positioning control method described with reference to FIGS. 10 to 14, the library apparatus 1 can be shifted to a normal operational state by simply performing the positioning control against a single reference cell at the time of apparatus initialization while performing correcting and updating of the position information of each cell 21. At the time of the initialization of the cell group at one surface of the accommodation rack, the robot is necessarily to be positioned at the flags which are arranged at least at three positions in the related art. However, with the present control method, the initialization can be completed simply by positioning the robot 3 at the reference cell at a single position. Therefore, the time necessary for the initialization can be remarkably decreased. In particular, in the library apparatus 1, when the accommodation rack 2 has two surfaces as illustrated in FIG. 9 or when the accommodation rack 2 has three surfaces or more, the effect of decreasing the initialization time with the present control method is significantly large since the positioning against the three flags or more for each surface has been performed in the related art.

Further, with the initialization method in the related art described with reference to FIG. 15, the reference flag and the relative position flag are arranged at least at three cells of the accommodation rack. However, with the present control method, the arrangement to the cell 21 of the accommodation rack 2 is unnecessary. Accordingly, the cell 21 of the accommodation rack 2 can be effectively utilized.

[4] Others

Here, not limited to the abovementioned embodiments, the present invention can be embodied with a variety of modifications within the scope of the teaching of the present invention.

For example, in the abovementioned embodiment, the objective target for positioning of the robot 3 (i.e., the hand mechanism 3a) is described to be each cell 21 of the accommodation rack 2 and the recording/reproducing device 4 in the library apparatus 1. However, not limited to this, as long as it is an object to which a robot is to be positioned, the present invention can be applied similarly to the abovementioned embodiments and similar operational effects can be obtained.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A library apparatus, comprising:
   a robot which transports a transportable medium; and
   an objective unit in which the robot is movably positioned thereto including a light receptor of an objective unit side and a light emitter of the objective unit side which emits light to the outside of the objective unit when light is received by the light receptor of the objective unit side;
   wherein the robot includes a light emitter of a robot side opposite to the light receptor of the objective unit side that emits light to the light receptor of the objective unit side at the time of positioning of the robot at the objective unit, and a light receptor of the robot side opposite to the light emitter of the objective unit side that receives light from the light emitter of the objective unit side at the time of positioning of the robot at the objective unit,
   further comprising a positioning control unit which performs positioning control of the robot against the objective unit so that the light receptor of the robot side receives light from the light emitter of the objective unit side,
   wherein the light receptor of the objective unit side and the light emitter of the objective unit side are provided respectively to a plurality of the objective units; and
   the positioning control unit stores a position of a first objective unit among the plurality of objective units obtained by performing positioning of the robot to the first objective unit at a storage portion as a first measured position, performs correction of a design position of an objective unit other than the first objective unit based on a difference between the first measured position and a design position of the first objective unit previously stored at the storage portion, and performs positioning control of the robot against an objective unit other than the first objective unit based on the design position after the correction.

2. The library apparatus according to claim 1, wherein the positioning control unit stores a position of a second objective unit other than the first objective unit obtained by performing positioning of the robot to the second objective unit based on the design position after the correction at the storage portion as a second measured position, performs further correction against the design position after the correction of an objective unit other than the first objective unit and the second objective unit based on a difference between the design position after the correction of the second objective unit and the second measured position, and performs positioning control of the robot against an objective unit other than the first objective unit and the second objective unit based on the design position after the further correction.

3. The library apparatus according to claim 2, wherein the light receptor of the objective unit side is configured to be one end surface of a light transmission member and the light emitter of the objective unit side is configured to be the other end surface of the light transmission member.

4. The library apparatus according to claim 1, wherein the objective unit includes a light emission control unit which controls the light emitter of the objective unit side to emit light when light is received by the light receptor of the objective unit side.

5. The library apparatus according to claim 1, wherein the light emitter of the robot side and the light receptor of the robot side are respectively covered by a mask plate which has a light penetration hole.

6. The library apparatus according to claim 5, wherein the light penetration hole corresponding to the light emitter of the robot side is oval shaped and the light penetration hole corresponding to the light receptor of the robot side has an oval shape so that the longitudinal diameter thereof is perpendicular to the direction of the longitudinal diameter of the light penetration hole corresponding to the light emitter of the robot side.

7. The library apparatus according to claim 1, wherein the light emitter of the objective unit side and the light receptor of the objective unit side are respectively covered by a mask plate which has a light penetration hole.

8. The library apparatus according to claim 7, wherein the light penetration hole corresponding to the light emitter of the objective unit side has an oval shape and the light penetration hole corresponding to the light receptor of the objective unit side has an oval shape so that the longitudinal diameter thereof is perpendicular to the direction of the longitudinal diameter of the light penetration hole corresponding to the light emitter of the objective unit side.

9. A robot which transports a transportable medium and which is positioned to a plurality of objective units respectively provided with a light receptor of an objective unit side and a light emitter of the objective unit side for emitting light to the outside when light is received by the light receptor of the objective unit side, the robot comprising:
   a light emitter of a robot side opposite to the light receptor of the objective unit side that emits light to the light receptor of the objective unit side at the time of positioning of the robot at the objective unit; and
   a light receptor of the robot side opposite to the light emitter of the objective unit side that receives light from the light emitter of the objective unit side at the time of positioning of the robot at the objective unit, further comprising a positioning control unit which performs positioning control of the robot against the objective unit so that the light receptor of the robot side receives light from the light emitter of the objective unit side, wherein the positioning control unit stores a position of a first objective unit among the plurality of objective units obtained by performing positioning of the robot to the first objective unit at a storage portion as a first measured position, performs correction of a design position of an objective unit other than the first objective unit based on difference between the first measured position and a design position of the first objective unit previously stored at the storage portion, and performs positioning control of the robot against an objective unit other than the first objective unit based on the design position after the correction.

10. The robot according to claim 9, wherein the positioning control unit stores a position of a second objective unit other than the first objective unit obtained by performing positioning of the robot to the second objective unit based on the design position after the correction at the storage portion as a second measured position, performs further correction against the design position after the correction of an objective unit other than the first objective unit and the second objective unit based on difference between the design position after the correction of the second objective unit and the second measured position, and performs positioning control of the robot against an objective unit other than the first objective unit and the second objective unit based on the design position after the further correction.

11. The robot according to claim 9, wherein the light emitter of the robot side and the light receptor of the robot side are respectively covered by a mask plate which has a light penetration hole.

12. The robot according to claim 11, wherein the light penetration hole corresponding to the light emitter of the robot side is shaped oval and the light penetration hole corresponding to the light receptor of the robot side is shaped oval so that the longitudinal diameter thereof is perpendicular to the direction of the longitudinal diameter of the light penetration hole corresponding to the light emitter of the robot side.

13. A method of orienting a robot with respect to an objective unit, comprising:

providing an objective unit including a light receptor and a light emitter;

receiving light by the light receptor of the objective unit;

emitting light to the outside of the objective unit when the light is received by the light receptor of the objective unit;

providing a robot with a robot light emitter and a robot light receptor;

positioning the robot movably in the objective unit;

disposing the robot light emitter opposite to the light receptor of the objective unit;

emitting light to the light receptor of the objective unit while the robot is positioned movably in the objective unit;

disposing the robot light receptor opposite to the light emitter of the objective unit;

receiving light from the light emitter of the objective unit while the robot is positioned movably in the objective unit;

positioning the robot against the objective unit with a positioning control unit so that the light receptor of the robot side receives light from the light emitter of the objective unit side;

storing a position of a first objective unit among the plurality of objective units obtained by performing positioning of the robot to the first objective unit as a first measured position;

correcting a design position of an objective unit other than the first objective unit based on a difference between the first measured position and a design position of the first objective unit previously stored; and positioning the robot against an objective unit other than the first objective unit based on the design position after the correction.

\* \* \* \* \*